UNITED STATES PATENT OFFICE.

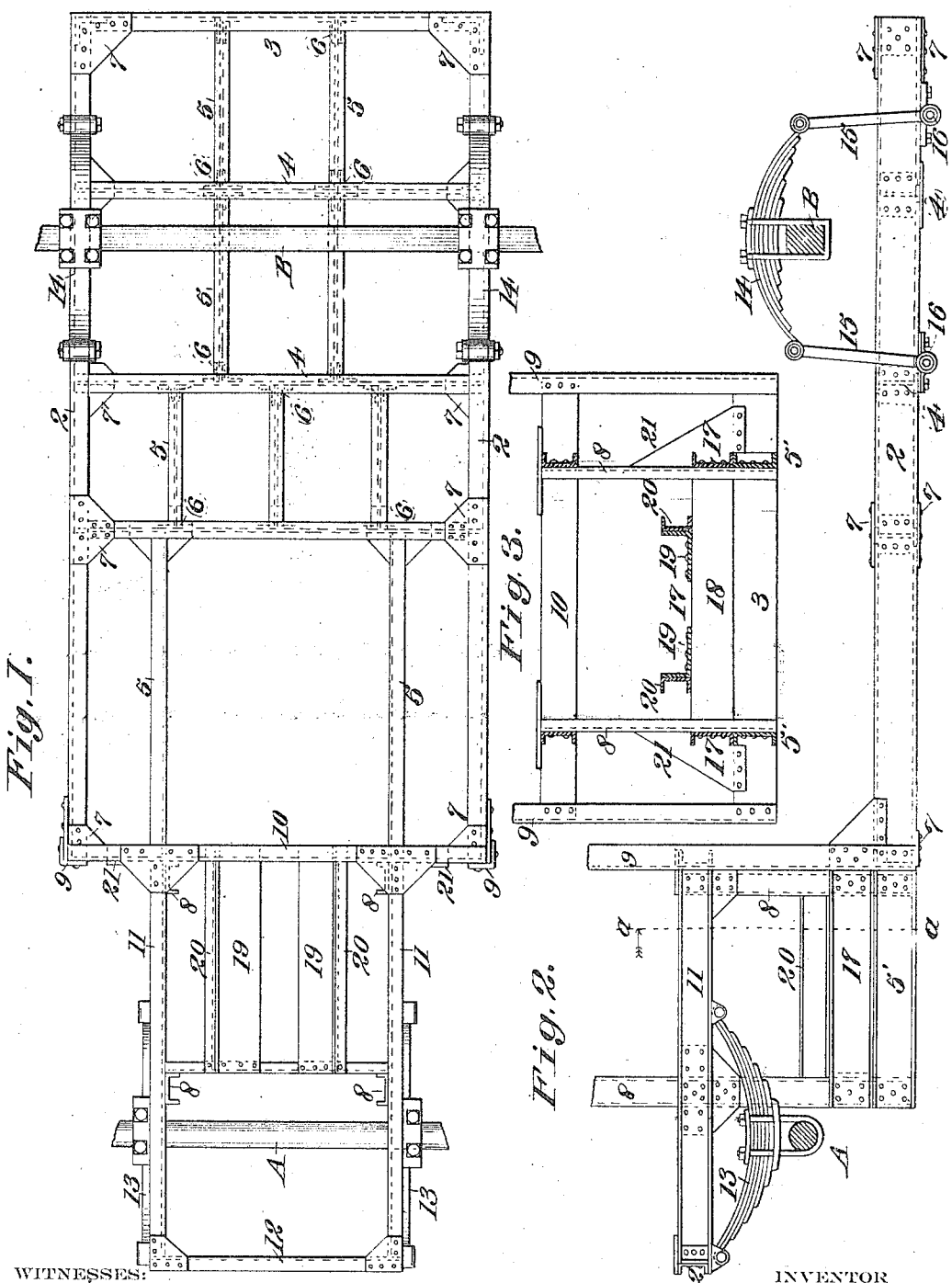

CHARLES H. BUTLER, OF OAKLAND, CALIFORNIA.

CHASSIS.

1,123,481.   Specification of Letters Patent.   Patented Jan. 5, 1915.

Application filed November 24, 1913. Serial No. 802,621.

*To all whom it may concern:*

Be it known that I, CHARLES H. BUTLER, a citizen of the United States, residing at Oakland, in the county of Alameda and State of California, have invented new and useful Improvements in Chassis, of which the following is a specification.

This invention relates to a chassis, and particularly pertains to a chassis which is especially adapted for use on power-operated vehicles.

It is the object of this invention to provide a chassis which will economize space, adapted to large spans, capable of supporting loads of considerable weight, and so built as to form a strong, substantial and rigid structure.

Another object is to provide a chassis of the low-down type in which the bed-frame is positioned close to the ground, and to so construct the chassis that it can be spring-supported at its forward end over the front axle of the vehicle and yieldably suspended at its rear end beneath the rear axle.

Other objects will appear hereinafter.

The invention primarily resides in a bed-frame formed with a raised forward end portion adapted to extend over the front axle of a vehicle, spring means interposed between the front axle and the raised portion of the bed-frame, and means for yieldably suspending the rear end of the frame beneath the rear axle.

The invention further consists of the parts and the construction and combination of parts as hereinafter more fully described and claimed, having reference to the accompanying drawings, in which—

Figure 1 is a plan view of the chassis. Fig. 2 is a side elevation of same. Fig. 3 is a transverse section and elevation on the line a—a of Fig. 2.

In the drawings the bed-frame portion of the chassis is shown as comprising a rectangular frame formed with side members 2, end members 3, and a series of lateral beams 4 secured to the side members 2 and spaced at suitable intervals apart throughout the length of the bed-frame. The side and end members 2 and 3 are preferably formed of channel-iron, and the lateral members 4 are formed of I-beams. The end members 3 and the lateral members 4 are connected together by means of longitudinally extending beams 5, which are secured at their ends to the members 3 and 4 by angle-irons 6.

The beams 4 and 5 are arranged in any suitable manner best adapted to give the necessary strength and rigidity to the bed-frame; gusset plates 7 being provided at the intersections of the members 2—3—4 and 5 to increase the horizontal stability of the structure. A pair of the longitudinal beams 5 is shown as connecting the forward end member 3 to the transverse beam 4 adjacent thereto; these beams 5 being extended to project beyond the outer face of the forward end member 3, as indicated at 5'. Connected to the outer end portions 5' of the beams 5 and at their intersection with the forward end member 3 are channel-iron uprights 8, and mounted at the intersection of the forward end member 3 and the side members 2 are angle-iron uprights 9. Carried on the angle-iron uprights 9 and spaced a suitable distance above the forward end member 3 is a transverse channel-iron 10, to which the upper ends of the uprights 8, contiguous to the end member 3, are secured.

Mounted on the uprights 8, on the level with the transverse member 10 and paralleling the extended portions 5' of the beams 5, are channel-iron beams 11. The outer ends of the beams 11 project beyond the outer uprights 9 and are connected toegther by means of a header beam 12. The beams 10—11 and 12, supported on the uprights 8, form a raised frame structure on the forward end of the bed-frame which is adapted to extend over the front axle A of a vehicle, and supported upon springs 13 of any suitable description interposed between the beams 11 and the axle A. The rear portion of the bed-frame is designed to be suspended beneath the rear axle B of the vehicle. This is accomplished by mounting spring members 14 on the rear axle B and connecting the spring members 14 to the side members 2 of the bed-frame by means of depending links 15, as particularly shown in Fig. 2, which links are pivoted at their lower ends to the underside of the side members 2, as shown at 16.

Mounted on the uprights 8 immediately above the extended portions 5' of the beams 5 are channel-iron beams 17, to which transverse beams 18 are connected, and supported on the transverse beams 18 are longitudinally disposed angle-irons 19 attached to channel-irons 20; the angle-irons 19 and channel-irons 20 forming a bed or support for the motor or engine in propelling the vehicle. Vertical gusset plates 21 are connected to the forward end member 3 and the upright channel-iron 8 thereagainst, to brace the latter and thereby increase their stability.

By forming the chassis as herein shown and described, it can be mounted to position the bed-frame portion close to the ground, which is particularly advantageous in truck construction.

Having thus described my invention, what I claim and desire to secure by Letters Patent is:

1. In a vehicle chassis, a rectangular bed-frame, comprising channel-iron side and end members and lateral beams connected to the said members, a raised forwardly extending end-frame on the front end of the bed-frame, spring members interposed between the raised end-frame and the front axle of the vehicle, a motor supporting frame situated between the front end of the bed-frame and the raised end-frame below said spring members, spring members carried by the rear axle, and links attached to the last named spring members connected with and suspending the rear portion of the bed-frame.

2. A vehicle chassis comprising a main frame, a narrowed portion secured to the front end of said frame, uprights projecting vertically from the junction of the end frame to the main frame, a second pair of uprights projecting vertically from the end of the end frame, and a support for the front of the chassis located outside of said last mentioned pair of uprights.

3. The combination with the front and rear axles of a vehicle, of a chassis having the front end raised to lie above the front axle, and formed to extend beneath the rear axle, and longitudinally extending members lying entirely back of the front axle rigidly secured to the chassis substantially midway between the main body thereof and said raised portion.

4. The combination with the front and rear axles of a vehicle, of a chassis having its front end raised to lie above the front axle, and formed to extend beneath the rear axle, spring members above the rear axle, means for suspending the rear end of the chassis from said spring members, and longitudinally extending members lying entirely back of the front axle rigidly secured to the chassis substantially midway between the main body thereof and said raised portion, for supporting a motor.

5. The combination with the front and rear axles of a vehicle, of a chassis having its front end narrowed to extend above the front axle and beneath the rear axle, spring members interposed between the front axle and the chassis, a motor supporting frame lying in a plane below said spring members and above said chassis, spring members above the rear axle, and depending links suspending the rear end of the chassis from the last named spring members.

6. In a vehicle chassis, a rectangular bed frame comprising channel-iron side and end members and lateral beams connected to the said members, a narrowed and forwardly extending end frame on the front end of the bed frame, spring members interposed between the raised end frame and the front axle of the vehicle, a motor supporting frame lying in a lower plane than said axle and located rearwardly thereof, the said frame lying in a plane above the channel-iron side members, spring members carried by the rear axle, and links attached to the last named spring members connecting with and suspending the rear portion of the bed frame.

7. A vehicle chassis comprising a rectangular bed-frame, a narrowed and raised end frame, supporting members for said end frame, attached to the uppermost longitudinal member above the front axle of the vehicle, and longitudinally extending channel-irons rigidly secured to said end frame below said members for supporting a motor.

8. A vehicle chassis comprising a pair of channel-iron side members, a plurality of lateral beams connected to said side members, a pair of uprights secured to the front end of the chassis inside of said side members, a narrowed frame projecting forwardly from said uprights, said frame comprising a lower pair of channel-irons, an upper pair of channel-irons for supporting the chassis, and an intermediate motor supporting frame.

9. A vehicle chassis comprising a pair of channel-iron side members, a pair of lateral beams connecting said side members at the ends thereof, a supplemental beam substantially midway between said pair of beams, and a pair of longitudinal beams located within and parallel to said side members and projecting from said supplemental beam forwardly beyond said front end beam.

10. A vehicle chassis comprising a pair of channel-iron side members, a pair of lateral beams connecting said side members at the ends thereof, a supplemental beam substantially midway between said pair of beams, a pair of longitudinal beams located within and parallel to said side members and projecting from said supplemental beam forwardly beyond said front end beam, and an upright projecting vertically from the junction of each of said longitudinal beams with the front end beams, and also from the forward end of each of said longitudinal beams.

11. A vehicle chassis comprising a pair of channel-iron side members, a pair of lateral beams connecting said side members at the ends thereof, a supplemental beam substantially midway between said pair of beams, a pair of longitudinal beams located within and parallel to said side members and projecting from said supplemental beam forwardly beyond said front end beams, an upright projecting vertically from the junction of each of said longitudinal beams with the front end beams and also from the forward end of each of said longitudinal beams, and a motor supporting frame carried by said uprights above the longitudinal beams.

12. A vehicle chassis comprising a pair of channel-iron side members, a pair of lateral beams connecting said side members at the ends thereof, a supplemental beam substantially midway between said pair of beams, a pair of longitudinal beams located within and parallel to said side members and projecting from said supplemental beam forwardly beyond said front end beams, an upright projecting vertically from the junction of each of said longitudinal beams with the front end beams and also from the forward end of each of said longitudinal beams, a motor supporting frame carried by said uprights above the longitudinal beams, and a pair of channel-irons projecting forwardly from the uprights and extending above the front axle of the vehicle, and springs attached to the underside of said channel-irons for supporting the front end of the chassis from the axle.

In testimony whereof I have hereunto set my hand in the presence of two subscribing witnesses.

CHARLES H. BUTLER.

Witnesses:
 JOHN H. HERRING,
 W. W. HEALEY.